W. K. JONES.

INFANT'S APPAREL.

APPLICATION FILED MAR. 17, 1917.

Reissued July 17, 1917. 14,328.

WITNESSES

INVENTOR

William K. Jones

BY

ATTORNEYS

UNITED STATES PATENT OFFICE.

WILLIAM KETCHUM JONES, OF WICHITA, KANSAS.

INFANT'S APPAREL.

14,328. Specification of Reissued Letters Patent. Reissued July 17, 1917.

Original No. 1,195,683, dated August 22, 1916, Serial No. 89,243, filed April 5, 1916. Application for reissue filed March 17, 1917. Serial No. 155,587.

*To all whom it may concern:*

Be it known that I, WILLIAM K. JONES, a citizen of the United States, and a resident of Wichita, in the county of Sedgwick and State of Kansas, have invented certain new and useful Improvements in Infants' Apparel, of which the following is a full, clear, and exact description.

This invention relates to certain improvements in infants' apparel and it is an object of the invention to provide a novel and improved body garment including means whereby shoulder suspension may be afforded to a nether garment.

This invention consists in the details of construction and in the combination and arrangement of the several parts of my improved apparel whereby certain important advantages are attained and the device is rendered simpler, less expensive and otherwise more convenient and advantageous for use, all as will be hereinafter more fully set forth.

The novel features of the invention will hereinafter be definitely claimed.

Figure 1:
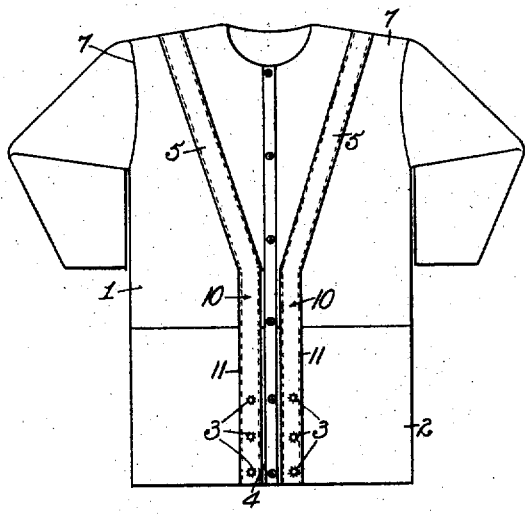
Figure 2:
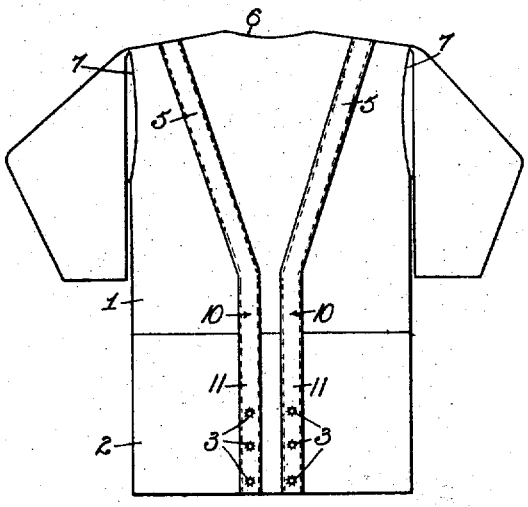

In order that my invention may be the better understood, I will now proceed to describe the same with reference to the accompanying drawings, wherein Figure 1 is a view in front elevation of a garment constructed in accordance with an embodiment of my invention; and Fig. 2 is a rear elevational view of the garment as disclosed in Fig. 1.

As disclosed in the accompanying drawings, 1 denotes a body garment of a type generally worn by young infants and having its skirt portion 2 returned to afford a double thickness so as to assure maintaining the abdomen and back of the infant warm. It is expressly understood that the returned or double thickness skirt portion 2 is specifically claimed in another application filed March 17, 1917, Serial No. 155,586.

The garment as herein disclosed is of a coat type and disposed vertically of the garment at opposite sides of the front opening are the reinforcing strips 10 disposed over the shoulders of the garment and extending the entire length of the front and back thereof. The extremities 11 of the strips 10 are provided with the openings 3 arranged in longitudinally spaced relation relative to the strips 10, and the openings of one strip are substantially in horizontal alinement with the openings of the second strip, said openings 3 being also directed through the adjacent portions of the garment proper and through which the attaching member of a safety pin or the like may be passed so that the nether garments may be properly supported. It will be apparent that the strips 10 will serve to reduce to a minimum the possibility of injury to the garment 1 as the suspension of the nether garment will be direct from the shoulders. By having the openings 3 arranged in vertically disposed series it will be at once perceived that an adjustable connection between the nether garments and the body garment may be effected as best meets the requirements of practice.

As is particularly disclosed in the accompanying drawings, it is to be observed that the extremities 11 of the strips 10 are in parallel relation with the extremities overlying the front of the garment spaced a predetermined distance inwardly of the front opening 4, while the extremities 11 overlying the back are spaced inwardly of the transverse center of the back. The intermediate portions 5 of the strips 10 are arranged on a predetermined incline toward the sides of the garment so that said members may be passed over the shoulders at a point substantially midway the neck opening 6 and the arm openings 7, so that strain will not be imposed upon the neck of the infant to which the garment is applied.

From the foregoing description it is thought to be obvious that an apparel constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

The openings 3 are reinforced to prevent tearing of the garments.

I claim:

1. As a new article of manufacture, an infant's body garment of the coat type and reinforcing strips arranged vertically of the garment and disposed over the shoulders thereof and extending substantially the entire length of the front and back of the garment, said strips being separated one from the other throughout their lengths, the intermediate portions of the strips passing over the shoulders of the garment approximately midway between the neck opening and the arm openings of the garment, the front extremities being substantially parallel and arranged at opposite sides of the median front opening of the garment, and the back extremities being substantially parallel and arranged at opposite sides of the back median line of the garment, the said front and back extremities of the said strips being provided with openings arranged in longitudinal spaced relation relative to the strips, and the openings in one strip being approximately in horizontal alinement with the openings of the other strip, the said openings extending through the adjacent portions of the garment proper.

2. As a new article of manufacture, a body garment having its skirt portion of doubled thickness, and reinforcing strips arranged vertically of the garment and disposed over the shoulders thereof and extending substantially the entire length of the front and back of the garment, said strips being arranged transversely of the doubled portion and being separated one from the other throughout their lengths, the extremities of the strips being provided with openings arranged in longitudinal spaced relation, the openings of one strip being substantially in horizontal alinement relative to the openings of the second strip.

3. As a new article of manufacture, a body garment having its skirt portions of doubled thickness, and reinforcing strips arranged vertically of the garment and disposed over the shoulders thereof and extending substantially the entire length of the garment, said strips being arranged transversely of the doubled portion and being separated one from the other throughout their lengths, the intermediate portions of the strips passing over the shoulders of the garment at points midway the neck opening and the arm openings of the garment, the extremities of the strips being substantially parallel and arranged at opposite sides of the transverse centers of the front and back of the garment, said parallel extremities being provided with openings.

WILLIAM KETCHUM JONES.

Copies of this patent may be obtained for five cents each, by addressing the "Commissioner of Patents Washington, D. C."